United States Patent
Cornforth et al.

(10) Patent No.: US 10,986,508 B2
(45) Date of Patent: Apr. 20, 2021

(54) ENHANCED NETWORK PERFORMANCE AND/OR CAPABILITY INFORMATION RELATED TO BOTH A MOBILE COMMUNICATION NETWORK AND A USER EQUIPMENT WITHIN THE MOBILE COMMUNICATION NETWORK

(71) Applicant: Deutsche Telekom AG, Bonn (DE)

(72) Inventors: Philip Cornforth, Hatfield (GB); John Tottingham, Frechen (DE); Claire Hilton, East Grinstead (GB)

(73) Assignee: DEUTSCHE TELEKOM AG, Bonn (DE)

( * ) Notice: Subject to any disclaimer, the term of this patent is extended or adjusted under 35 U.S.C. 154(b) by 453 days.

(21) Appl. No.: 15/810,181

(22) Filed: Nov. 13, 2017

(65) Prior Publication Data

US 2018/0139622 A1    May 17, 2018

(30) Foreign Application Priority Data

Nov. 14, 2016 (EP) ..................... 16198763

(51) Int. Cl.
| | |
|---|---|
| *H04W 16/18* | (2009.01) |
| *H04W 24/02* | (2009.01) |
| *H04W 24/00* | (2009.01) |
| *G06T 11/60* | (2006.01) |
| *H04B 17/318* | (2015.01) |

(52) U.S. Cl.
CPC ........... *H04W 16/18* (2013.01); *H04W 24/00* (2013.01); *H04W 24/02* (2013.01); *G06T 11/60* (2013.01); *H04B 17/318* (2015.01)

(58) Field of Classification Search
CPC ...... G06T 11/60; H04B 17/318; H04W 16/18; H04W 24/00; H04W 24/02
See application file for complete search history.

(56) References Cited

U.S. PATENT DOCUMENTS

| | | | |
|---|---|---|---|
| 7,349,692 B2 | 3/2008 | Ko et al. | |
| 2004/0203926 A1* | 10/2004 | Ruutu | H04W 64/00 455/456.1 |
| 2005/0260982 A1* | 11/2005 | Ko | H04L 41/00 455/423 |
| 2014/0308962 A1* | 10/2014 | Zhang | H04W 40/246 455/440 |
| 2019/0281542 A1* | 9/2019 | Hevizi | H04W 24/04 |
| 2019/0370137 A1* | 12/2019 | Bellingan | G06F 11/2294 |

FOREIGN PATENT DOCUMENTS

WO    WO 0213009 A1    2/2002

* cited by examiner

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

A method for providing enhanced network performance and/or capability information related to at least one mobile communication network and a user equipment includes: in a first step, location information is determined and/or provided; and in a second step, subsequent to the first step, network performance and/or capability information is displayed on a display device or a projection device.

18 Claims, 2 Drawing Sheets

ENHANCED NETWORK PERFORMANCE AND/OR CAPABILITY INFORMATION RELATED TO BOTH A MOBILE COMMUNICATION NETWORK AND A USER EQUIPMENT WITHIN THE MOBILE COMMUNICATION NETWORK

CROSS-REFERENCE TO RELATED APPLICATIONS

Priority is claimed to European Patent Application No. EP 16 198 763.1, filed on Nov. 14, 2016, the entire disclosure of which is hereby incorporated by reference herein.

FIELD

The present invention relates to a method to provide enhanced network performance and/or capability information related to at least one mobile communication network and a user equipment, wherein the mobile communication network comprises an access network and a core network, wherein the access network comprises a plurality of base station entities and/or a plurality of wireless access points, wherein the plurality of base station entities and/or the plurality of wireless access points are able to provide—at least potentially and depending on the current location of the user equipment—radio coverage to the user equipment via transmitting downlink data to the user equipment and/or receiving uplink data from the user equipment using at least one radio access technology out of a plurality of different radio access technologies.

Furthermore, the present invention relates to a system and a mobile communication network for the provision of enhanced network performance and/or capability information related to at least one mobile communication network and a user equipment, the user equipment being able to be connected to the mobile communication network and the system comprising the mobile communication network and the user equipment, wherein the mobile communication network comprises an access network and a core network, wherein the access network comprises a plurality of base station entities and/or a plurality of wireless access points, wherein the plurality of base station entities and/or the plurality of wireless access points are able to provide—at least potentially and depending on the current location of the user equipment—radio coverage to the user equipment via transmitting downlink data to the user equipment and/or receiving uplink data from the user equipment using at least one radio access technology out of a plurality of different radio access technologies.

Furthermore, the present invention relates to a program and to a computer program product to provide enhanced network performance and/or capability information related to both a mobile communication network and a user equipment within the mobile communication network.

BACKGROUND

Wireless communication networks or mobile communication networks are widely deployed to provide various communication services such as telephony, video, data, messaging, broadcasts, and so on. Such networks, which are usually multiple access networks, support communications for multiple users by sharing the available network resources.

Users, customers or subscribers of such mobile communication networks typically access such networks using mobile devices, handsets or user equipments, such as mobile phones, mobile computing devices such as smart phones, tablet computer devices and the like.

Network coverage information regarding such mobile communication networks are typically available to a user of such mobile devices or handsets via a simple (or native, i.e. typically implemented in the operation system of the user equipment) signal strength indication of the radio signal received (by the user equipment or handset) from a specific mobile communication network, typically such radio signal being emitted by a base station entity or wireless access point associated or related to the mobile communication network. Furthermore, it is known to display network coverage information regarding one or a plurality of mobile communication networks via using a specific application or app (or a specific program of software module within the user equipment).

Furthermore, network coverage information is also available on a more general level, and independent from a specific user equipment located at a specific location: Such general network coverage information might provide network coverage information overlaid on a map information (or other geographical information) in order to provide guidance or an indication at which locations network coverage should be higher or better and where it should be less so. However, such network coverage information provided on a general level are typically based on (comparatively large scale geographical) averages and, hence, provide only poor granularity. This means that generally, such general network coverage information does not provide useful information to a specific user located at a specific location.

SUMMARY

In an exemplary embodiment, the present invention provides a method for providing enhanced network performance and/or capability information related to at least one mobile communication network and a user equipment, wherein the at least one mobile communication network comprises an access network and a core network, wherein the access network comprises a plurality of base station entities and/or a plurality of wireless access points, wherein the plurality of base station entities and/or the plurality of wireless access points are configured to provide radio coverage to user equipments via transmitting downlink data to the user equipments and/or receiving uplink data from the user equipments using at least one radio access technology out of a plurality of different radio access technologies, wherein the user equipment comprises or is assigned to a display device or a projection device. The method includes the following steps: in a first step, location information is determined and/or provided, wherein the location information: refers to the current geographical location of the user equipment and is determined by the user equipment and/or by the at least one mobile communication network; and/or is provided by a user of the user equipment; in a second step, subsequent to the first step, network performance and/or capability information is displayed on the display device or the projection device, wherein the network performance and/or capability information comprises or is dependent on: network planning information; first measurement information, the first measurement information being obtained by the user equipment via conducting measurements—prior to or during the second step—related to at least part of the plurality of base station entities and/or at least part of the plurality of wireless access points and their corresponding radio coverage; and/or second measurement information, the second measurement information being obtained from measurement events—prior to or during the second step—related to at least part of the plurality of base station entities and/or at least part of the plurality of wireless access points and their corresponding radio coverage.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide a technically simple and effective solution in order to provide enhanced network performance and/or capability information related to both a mobile communication network and a user equipment within the mobile communication network such that it is possible for a user to obtain guidance as to the network performance of the mobile communication network—e.g. coverage, network capabilities, etc.—with a comparatively high degree of geographical granularity.

In an exemplary embodiment, the present invention provides a method to provide enhanced network performance and/or capability information related to both a mobile communication network and a user equipment within the mobile communication network, wherein the mobile communication network comprises an access network and a core network, wherein the access network comprises a plurality of base station entities and/or a plurality of wireless access points, wherein the plurality of base station entities and/or the plurality of wireless access points are able to provide—at least potentially and depending on the current location of the user equipment—radio coverage to the user equipment via transmitting downlink data to the user equipment and/or receiving uplink data from the user equipment using at least one radio access technology out of a plurality of different radio access technologies, wherein the user equipment comprises or is assigned to a display device or a projection device, wherein the method comprises the following steps:
in a first step, location information is determined and/or provided, wherein the location information
refers to the current geographical location of the user equipment and is determined by the user equipment and/or by the mobile communication network, and/or
is provided by a user of the user equipment,
in a second step, subsequent to the first step, network performance and/or capability information is displayed on the display device or the projection device of or assigned to the user equipment, wherein the network performance and/or capability information comprises or is dependent on at least one out of the following:
network planning information,
first measurement information, the first measurement information being obtained by the user equipment via conducting measurements—prior to or during the second step—related to at least part of the plurality of base station entities and/or at least part of the plurality of wireless access points and their corresponding radio coverage,
second measurement information, the second measurement information being obtained from measurement events—prior to or during the second step—related to at least part of the plurality of base station entities and/or at least part of the plurality of wireless access points and their corresponding radio coverage.

It is thereby advantageously possible according to the present invention that useful information can be brought to the user or customer of a mobile device or user equipment within the mobile communication network. It is furthermore advantageously possible to provide such network performance and/or capability information using an augmented reality view or a virtual reality view, i.e. the network performance and/or capability information can be displayed such that a comparatively high degree of convenience is realized for the user or customer of the mobile device of user equipment accessing the network performance and/or capability information. According to the present invention, it is hence advantageously possible, for a specific customer or user of the mobile device or user equipment, to see the mobile communication network (or to see the capabilities and/or network coverage of the mobile communication network) in connection to the environment or other points of interest, especially in the vicinity of the current location of the mobile device or user equipment.

According to the present invention, it is hence advantageously possible to provide—to a specific user or customer of the network and/or on a specific mobile device or user equipment—network performance and/or capability information that is particular to the customer, especially based on both handset measurements (i.e. performed by the user equipment) and network predictions (and/or network measurements).

Especially, it is advantageously possible to provide the network performance and/or capability information dependent from the orientation of the user and/or the user equipment, providing the possibility of a first person view where the user equipment displays the view as if seen by the users own eyes, presented especially using augmented reality or virtual reality.

The method according to the present invention provides enhanced network performance and/or capability information related to at least one mobile communication network and a user equipment within the mobile communication network. Typically such mobile communication networks comprise an access network and a core network, wherein the access network comprises a plurality of base station entities and/or a plurality of wireless access points. A wireless access point could also be realized via a mobile device, a smart device, or an internet-of-things device, machine-to-machine device or a sensor device, providing or potentially providing communication services to the user equipment.

The plurality of base station entities and/or the plurality of wireless access points are able to provide—at least potentially and depending on the current location of the user equipment—radio coverage to the user equipment via transmitting downlink data to the user equipment and/or receiving uplink data from the user equipment using at least one radio access technology out of typically a plurality of different radio access technologies.

Furthermore according to the present invention, the user equipment comprises or is assigned to a display device or a projection device in order that the network performance and/or capability information can be easily presented to a customer or user of the considered user equipment. According to the present invention, the display device or projection device is a holographic device and/or able to provide holographic or threedimensional image or representations.

It is advantageously possible according to the present invention that the network performance and/or capability information comprises real time network information included (e.g. cell site failures, cell load, etc.) that is typically only available from the operator of the mobile communication network.

It is furthermore advantageously possible according to the present invention that network functionality/information (or network performance and/or capability information) includes one or more of the following:
  providing information regarding the current coverage on an area, and per selected radio access technology (such as 2G radio access technology, 3G radio access technology, 4G radio access technology etc.);
  location and distance information to the (or at least the nearest) radio entities of the access network used (i.e. the base station entities and/or the wireless access points, such as cell Sites and WiFi hotspots) in order to be able to locate the strongest radio signal;
  information regarding the current coverage as well as location and distance information to radio entities of the access network used based on a location or a position of the mobile device or the user equipment in a building, i.e. typically when the user (or the mobile device or user equipment) is located in such a building,
  the expected performance (i.e. being able to "see" or to be provided with an indication regarding the quality and/or speed and/or capacity of the mobile communication network at the considered location);
  customer impacting network faults, network maintenance and resolution estimates;
  future network view (to see future impact of e.g. new Sites, 5G rollout etc.);
  report from the user poor performance at a location;
  network rating.

Furthermore according to the present invention, an exemplary embodiment of the inventive method comprises a first step, during which location information is determined and/or provided, wherein the location information either refers to the current geographical location of the user equipment and is determined by the user equipment and/or by the mobile communication network and/or the location information is provided by a user of the user equipment. In most cases, what a user, client or subscriber of the mobile communication network is likely to be interested in is the network performance and/or capability information in the vicinity of its current position or current geographical location. This use case is particularly adapted to the use of augmented reality or virtual reality scenarios, such as visualizing the network performance and/or capability information overlaid on video or photographic images of the geographical vicinity of the user equipment, especially using video data or photographic images generated by a video or camera device within the user equipment or mobile device itself. However, according to another embodiment of the present invention, the location information is provided by the user of the user equipment, and hence does not need to refer to the current geographical location but could refer to any (remote) geographical location being different from the current geographical location of the user equipment. Even in this situation, it might be possible to nevertheless use augmented reality or virtual reality scenarios, e.g. via using video data or photographic images related to that remote geographical location that could be overlaid by network performance and/or capability information of the vicinity of that remote geographical location.

Furthermore according to the present invention, an exemplary embodiment of the inventive method comprises a second step, subsequent to the first step, wherein network performance and/or capability information is displayed on the display device or the projection device of or assigned to the user equipment, wherein the network performance and/or capability information comprises or is dependent on at least one out of network planning information, first measurement information, and second measurement information. The first measurement information relates to information obtained by the user equipment via conducting measurements—prior to or during the second step—related to at least part of the plurality of base station entities and/or at least part of the plurality of wireless access points and their corresponding radio coverage, especially signal strength measurements of the user equipment. The second measurement information are obtained from measurement events—prior to or during the second step—related to at least part of the plurality of base station entities and/or at least part of the plurality of wireless access points and their corresponding radio coverage.

According to the present invention, it is preferred that the network performance and/or capability information is displayed on the display device or the projection device as augmented reality information or virtual reality information and/or
wherein during or after the first step, the location information is transmitted, by the user equipment to the mobile communication network, wherein especially network performance and/or capability information is requested, from the mobile communication network, dependent on the location information and/or
wherein the network performance and/or capability information comprises a first part and a second part, wherein the first part of the network performance and/or capability information is related to a first radio access technology and wherein the second part of the network performance and/or capability information is related to a second radio access technology.

Via the network performance and/or capability information comprising a first part and a second part, wherein the first part of the network performance and/or capability information is related to a first radio access technology and wherein the second part of the network performance and/or capability information is related to a second radio access technology, it is advantageously possible to visualize different radio access technologies in a different manner on the display device or the projection device of or associated to the user equipment.

Additionally, it is preferred according to the present invention that the network planning information are transmitted, by the mobile communication network, to the user equipment prior to or during the second step, and/or wherein the second measurement information relates to previous measurement events performed by one or a plurality of user equipments within the mobile communication network.

Via transmitting the network planning information to the user equipment prior to or during the second step, it is advantageously possible that the user equipment is provided with a first estimation regarding the network performance and/or capability. Furthermore, via the second measurement information relating to previous measurement events performed by one or a plurality of user equipment within the mobile communication network, it is advantageously possible according to the present invention to base the network performance and/or capability information not only on measurement events performed by the user equipment itself but also on measurement events (preceding in time) performed by either different user equipments or performed by the same user equipment previously.

According to the present invention, it is furthermore preferred that the network performance and/or capability information displayed on the display device or the projection device of or assigned to the user equipment comprises a plurality of performance and/or capability values, each performance and/or capability value being assigned to one grid portion or grid location of a geographical grid in the vicinity of the geographical location corresponding to the location information, wherein, for each one of the grid portions or grid locations, the corresponding performance and/or capability value displayed is dependent on the network planning information, the first measurement information, and the second measurement information in the vicinity of the geographical location corresponding to the location information.

Via dividing a geographic area into grid portions or grid locations, it is advantageously possible to calculate and to assign the network performance and/or capability information as a function of the network planning information, the first measurement information, and the second measurement information in the vicinity of the geographical location corresponding to the location information. Typically, each grid portion or grid location corresponds to a defined geographical section (around a geographical location) of, for example, but not specifically limited to, 1 meter or 2 meters or 5 meters or 10 meters or 30 meters or 50 meters or 100 meters or 300 meters or 1000 meters.

According to the present invention, it is furthermore preferred that the performance and/or capability value displayed for a specific grid portion or a specific grid location is calculated based on values of the network planning information and/or values of at least one of the first measurement information and the second measurement information corresponding to the specific grid portion or the specific grid location itself, and:

the corresponding values of the network planning information and values of at least one of the first measurement information and the second measurement information of at least part of the grid portions or the grid locations being direct neighbors of the specific grid portion or the specific grid location, and/or the corresponding values of the network planning information and values of at least one of the first measurement information and the second measurement information of at least part of the grid portions or the grid locations being indirect neighbors of the specific grid portion or the specific grid location, and/or the distance of the specific grid portion or the specific grid location from one or a plurality of base station entities and/or of wireless access points and/or the orientation of the line segment between the specific grid portion or the specific grid location to one or a plurality of base station entities and/or of wireless access points.

Via not only using the values of the network planning information and the first and second measurement information corresponding to the specific grid portion or the specific grid location itself but also taking into consideration direct and/or indirect neighboring grid portions or grid locations and/or the distance and/or orientation towards base station entities and/or wireless access points, it is advantageously possible to provide more realistic network performance and/or capability information to the user equipment.

According to still a further preferred embodiment of the present invention the performance and/or capability value, displayed for a specific grid portion or a specific grid location, is calculated based on a comparison, especially an interpolation, of the values of the network planning information and measurement values obtained by the user equipment via conducting measurements, especially of the measured signal strength (MSSH), of the user equipment.

According to still a further preferred embodiment of the present invention, the location information comprises an indication of elevation of the geographical location corresponding to the location information, the indication of elevation corresponding especially to the elevation above ground and/or to the elevation above sea level of the geographical location corresponding to the location information, wherein the performance and/or capability value, displayed for a specific grid portion or a specific grid location, is dependent on the indication of elevation of the location information.

Via using an indication of elevation of the geographical location corresponding to the location information, it is advantageously possible according to the present invention to provide the network performance and/or capability information adapted to the appropriate vertical "layer", e.g. of the user equipment. This is especially advantageous in case that indoor network coverage is required by the user equipment.

Furthermore according to the present invention, it is advantageously possible and preferred according to the present invention that the network performance and/or capability information comprises or is dependent on data transmission performance information, the data transmission performance information being related to the expected data transmission performance at the geographical location corresponding to the location information, and/or wherein the network performance and/or capability information comprises or is dependent on network fault information and/or network maintenance information and/or network modification information, the network modification information relating to network sites to be deployed, to be upgraded and/or to be removed in the future.

Thereby, it is advantageously possible to enrich the network performance and/or capability information with additional sources of information available within the mobile communication network.

According to a further embodiment of the present invention, the geographical grid comprises—at least for part of the grid portions or the grid locations—geographical height grid elements, the different geographical height grid elements at a specific grid portion or a specific grid location corresponding to different elevations or ranged of elevation above ground and/or to different elevations or ranged of elevation above sea level, wherein the indication of elevation of the geographical location corresponds to identifying one geographical height grid element of the geographical grid.

Thereby, it is advantageously possible according to the present invention to provide the network performance and/or capability information adapted to the respective geographical height grid element, e.g. of the user equipment. This is especially advantageous in case that indoor network coverage is required by the user equipment.

According to a further embodiment according to the present invention, the method comprises a third step subsequent to the first step, wherein during the third step report information is transmitted, from the user equipment to the mobile communication network, wherein the report information corresponds to measured and/or perceived network performance and/or to measured and/or perceived network capability of the mobile communication network from the perspective of the user equipment.

Via transmitting the report information from the user equipment to the mobile communication network, it is advantageously possible to automatically provide feedback regarding measured and/or perceived network performance and/or regarding measured and/or perceived network capability of the mobile communication network from the perspective of the user equipment.

Furthermore, the present invention relates to a system for the provision of enhanced network performance and/or capability information related to at least one mobile communication network and a user equipment, the user equipment being connected to the mobile communication network and the system comprising the mobile communication network and the user equipment, wherein the mobile communication network comprises an access network and a core network, wherein the access network comprises a plurality of base station entities and/or a plurality of wireless access points, wherein the plurality of base station entities and/or the plurality of wireless access points are able to provide—at least potentially and depending on the current location of the user equipment—radio coverage to the user equipment via transmitting downlink data to the user equipment and/or receiving uplink data from the user equipment using at least one radio access technology out of a plurality of different radio access technologies, wherein the user equipment comprises or is assigned to a display device or the projection device, wherein the system is configured such that:

location information is determined and/or provided, wherein the location information refers to the current geographical location of the user equipment and is determined by the user equipment and/or by the mobile communication network and/or is provided by a user of the user equipment, network performance and/or capability information is displayed on the display device or the projection device of or assigned to the user equipment, wherein the network performance and/or capability information comprises or is dependent on at least one out of the following:

network planning information, first measurement information, the first measurement information being obtained by the user equipment via conducting measurements—prior to or during the second step—related to at least part of the plurality of base station entities and/or at least part of the plurality of wireless access points and their corresponding radio coverage, second measurement information, the second measurement information being obtained by the mobile communication network via the mobile communication network conducting measurements—prior to or during the second step—related to at least part of the plurality of base station entities and/or at least part of the plurality of wireless access points and their corresponding radio coverage.

Thereby, it is advantageously possible to provide a system such that the advantages described in relation to an exemplary embodiment of the inventive method can be realized and useful information be brought to the user or customer of a mobile device or user equipment within the mobile communication network.

Furthermore, the present invention relates to a mobile communication network system for the provision of enhanced network performance and/or capability information related to both the mobile communication network and a user equipment, the user equipment being connected to the mobile communication network, wherein the mobile communication network comprises an access network and a core network, wherein the access network comprises a plurality of base station entities and/or a plurality of wireless access points, wherein the plurality of base station entities and/or the plurality of wireless access points are able to provide—at least potentially and depending on the current location of the user equipment—radio coverage to the user equipment via transmitting downlink data to the user equipment and/or receiving uplink data from the user equipment using at least one radio access technology out of a plurality of different radio access technologies, wherein the mobile communication network is configured such that:

location information is determined and/or provided, wherein the location information refers to the current geographical location of the user equipment and is determined by the user equipment and/or by the mobile communication network and/or is provided by a user of the user equipment, network performance and/or capability information is displayed on a display device or the projection device of or assigned to the user equipment, wherein the network performance and/or capability information comprises or is dependent on at least one out of the following:

network planning information, first measurement information, the first measurement information being obtained by the user equipment via conducting measurements—prior to or during the second step—related to at least part of the plurality of base station entities and/or at least part of the plurality of wireless access points and their corresponding radio coverage, second measurement information, the second measurement information being obtained by the mobile communication network via the mobile communication network conducting measurements—prior to or during the second step—related to at least part of the plurality of base station entities and/or at least part of the plurality of wireless access points and their corresponding radio coverage.

Thereby, it is advantageously possible to provide a mobile communication network such that the advantages described in relation to an exemplary embodiment of the inventive method can be realized and useful information be brought to the user or customer of a mobile device or user equipment within the mobile communication network.

It is furthermore preferred—especially with regard to exemplary embodiments of the inventive system and the inventive mobile communication network—that the mobile communication network comprises a database entity, wherein the database entity especially comprises the network planning information and/or the first measurement information and/or the second measurement information.

Additionally, the present invention relates to a program comprising a computer readable program code which, when executed on a computer and/or on a user equipment and/or on a network node of a mobile communication network or on a plurality of network nodes of a mobile communication network, or in part on a user equipment and/or in part on a network node of a mobile communication network and/or in part on a plurality of network nodes of a mobile communication network, causes the computer and/or the user equipment and/or the network node of the mobile communication network and/or the plurality of network nodes of the mobile communication network to perform an exemplary embodiment of the inventive method.

Still additionally, the present invention relates to a computer program product to provide enhanced network performance and/or capability information related to at least one mobile communication network and a user equipment within the mobile communication network, the computer program product comprising a computer program stored on a storage medium, the computer program comprising program code which, when executed on a computer and/or on a user equipment and/or on a network node of a mobile communication network or on a plurality of network nodes of a mobile communication network, or in part on a user equipment and/or in part on a network node of a mobile communication network and/or in part on a plurality of network nodes of a mobile communication network, causes the computer and/or the user equipment and/or the network node of the mobile communication network and/or the plurality of network nodes of the mobile communication network to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
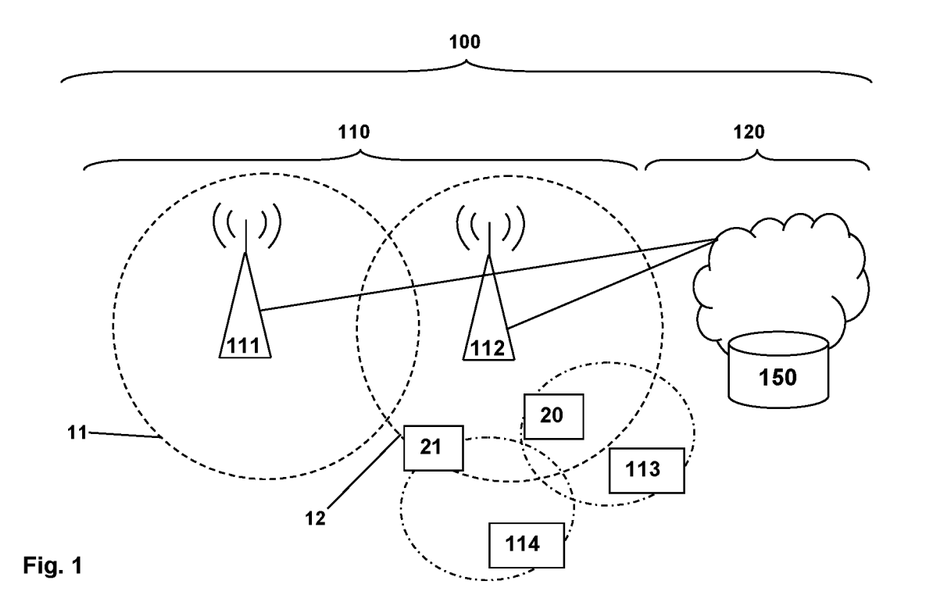
FIG. 1 schematically illustrates a mobile communication network, comprising a core network and an access network, the access network comprising a plurality of base station entities and/or a plurality of wireless access points.

In FIG. 1, a mobile communication network 100, especially a public land mobile network, according to the present invention is schematically shown. In the exemplary embodiment shown in FIG. 1, the mobile communication network 100 comprises an access network 110 and a core network 120, the core network 120 comprising—besides typically a multitude of different network nodes that are not explicitly shown in FIG. 1—a database entity 150. The mobile communication network 100 is preferably a cellular telecommunications network comprising typically a plurality of network cells (or radio cells), wherein two neighboring network cells (or radio cells) are represented in FIG. 1 via reference signs 11 and 12. The mobile communication network 100 furthermore typically comprises a plurality of user equipments or telecommunication devices, two of which are referred to via reference signs 20, 21, wherein reference sign 20 refers to a first user equipment, and reference sign 21 refers to a second user equipment. The access network 110 of the mobile communication network 100 comprises, in the exemplary representation of FIG. 1, a first base station entity 111, serving the first radio cell 11. Furthermore, a second base station entity 112, serving the second radio cell 12, is schematically shown. Additionally, the access network 120 comprises a plurality of wireless access points 113, 114. The base transceiver stations 111, 112 are typically base stations or base station entities, e.g. a NodeB or an eNodeB base transceiver station.

According to the present invention, a method to provide enhanced network performance and/or capability information related to the (first) user equipment 20 connected to or within the mobile communication network 100. The first user equipment 20 is exemplarily considered in the context of the present description, however, typically for any other user equipment within or connected to the mobile communication network 100, the following consideration equally apply.

The plurality of base station entities 111, 112 and/or the plurality of wireless access points 113, 114 are able to provide—at least potentially and depending on the current location of the user equipment 20—radio coverage to the user equipment 20 via transmitting downlink data to the user equipment 20 and/or receiving uplink data from the user equipment 20 using at least one radio access technology out of a plurality of different radio access technologies. According to the present invention, it is intended to provide to the user of the user equipment 20 a visualization of the network performance and/or capability information; hence the user equipment 20 should comprise or at least be assigned to a display device or a projection device.

Figure 2:
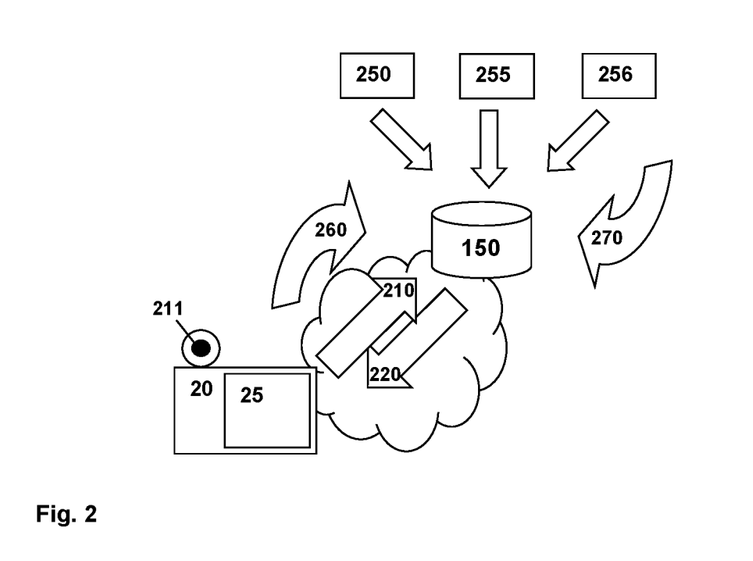
FIG. 2 schematically illustrates a system according to an exemplary embodiment of the present invention for the provision of enhanced network performance and/or capability information related to at least one mobile communication network and a user equipment, wherein the system comprises at least one database.

In FIG. 2, an exemplary embodiment of an inventive system according to the present invention for the provision of enhanced network performance and/or capability information related to both the mobile communication network 100 and the user equipment 20 is schematically shown, wherein the system comprises the mobile communication network 100 with at least one database 150 and wherein the user equipment 20 comprises (or is connected to) a display device or a projection device 25.

In a first step according to an exemplary embodiment of the inventive method, a location information 210 is determined and/or provided, and the location information 210 either refers to the current geographical location 211 of the user equipment 20 (and is determined by the user equipment 20 and/or by the mobile communication network 100) or it is provided by a or the user of the user equipment 20. In a second step, network performance and/or capability information 220 is displayed on the display device 25 or the projection device of or assigned to the user equipment 20, wherein the network performance and/or capability information 220 comprises or is dependent on at least one out of network planning information 250, first measurement information 260, and second measurement information 270. Thereby, the first measurement information 260 are obtained by the user equipment 20 via conducting measurements—prior to or during the second step—related to at least part of the plurality of base station entities 111, 112 and/or at least part of the plurality of wireless access points 113, 114 and their corresponding radio coverage, and the second measurement information 270 are obtained from measurement events—prior to or during the second step—related to at least part of the plurality of base station entities 111, 112 and/or at least part of the plurality of wireless access points 113, 114 and their corresponding radio coverage.

The database entity 150 (or database and server entity) serves as a central database/server and holds network data (i.e. data regarding the (calculated and/or measured) signal strength at different locations, data regarding the provided speed or bandwidth capacity of the mobile communication network at different locations, data regarding the capacity of the mobile communication network 100 (e.g. latency, speed, quality of service etc.) at different locations, location data, as well as planning data, network status data (e.g. fault information, outage information), etc.) in addition to data reported by (other or the same) handsets using the system. Additional sources of network data can be crowd sourcing, internet-of-things sensors, machine-to-machine sensors etc. Regarding network coverage data, the user equipment (or handset) 20 is accessing the data of the database entity 150, especially using a specific app(lication) or app(lication) module which reports the location information 210 to the server (or to the database entity 150) and any network measurements it makes itself.

According to a variant of the present invention, the database entity 150 (or server entity) will combine handset data with predictive data from a planning tool used within the mobile communication network 100 (network planning tool) in order to produce a combined data set for the requesting user equipment 20 (or handset), which data is then delivered back to the user equipment 20 (or handset). According to a further variant, the calculation is done in the user equipment 20 with the database entity 150 providing a initial data set for further processing by the user equipment 20. Based on the processes data a graphical rendering is produced on the display device or projection device.

In general, planning data in most cases refer to the ground level, i.e. provided a ground level view; however, the user equipment 20 (or handset) may be located higher (e.g. on the 10th floor of a building). Hence, signal level improvement with height needs to be taken account of by prioritizing (or giving an increased weight to) handset measurements (relating to the real signal level of radio signals received, e.g., by base station entities) over the planned (predicted) signal level in the immediate vicinity of the user equipment 20 (or handset). In addition, the database entity 150 (or server entity) provides cell site location data, (a full data set on first use of the app(lication), then only updates (changes would in many cases be infrequent, as, very often, user equipments are used repeatedly at the same relatively small set of locations) are provided in order to minimize data volumes). The app(lication) of or within the user equipment 20 (or handset) is then able to use a position information (derived, e.g., from accelerometer data and/or Global Positioning System (GPS) sensor data and/or compass sensor data and/or other sensor data available within the user equipment 20) to render a screen view of the network according to its own (first person) view, especially overlaid via augmented or virtual reality onto the camera view. Hence, according to the present invention, it is advantageously possible to provide real time information regarding network coverage, despite the fact that coverage planning data are very often not updated real time (as it takes many hours for the tool to calculate a coverage map based on existing cell site positions and parameters).

According to the present invention, it is, thus, advantageously possible to bring useful network information to the customer or user of a user equipment 20 (or handset) in an exciting way, enabling a more emotional connection between the customer and the mobile communication network 100 and/or its operator. Via presenting network information (i.e. network performance and/or capability information 220) to the customer via an augmented or virtual reality view, it is advantageously possible according to the present invention that the user or customer is enabled to 'see' the mobile communication network 100 from the chosen viewpoint in real time.

Advantageously, it is possible according to the present invention, to show current coverage in the vicinity of the geographical location 211 of the user equipment 20 per selected technology (such as 2G technology, 3G technology, 4G technology, 5G technology);

provide information regarding the location and the distance to the nearest cell sites (i.e. base station entities 111, 112 or wireless access points 113, 114), and regarding the location of the strongest signal;

provide information regarding wireless coverage or WiFi coverage;

provide information regarding in-building systems;

provide information regarding the expected data performance (i.e. the speed/capacity of the mobile communication network at a specific location);

provide information regarding customer impacting network faults and/or network maintenance;

provide information regarding future implementations of the mobile communication network 100 (e.g., in order to see the future impact of, e.g., new sites, 5G rollout etc.);

provide the possibility to report poor network performance at a specific location;

provide the possibility of network rating.

Figure 3:
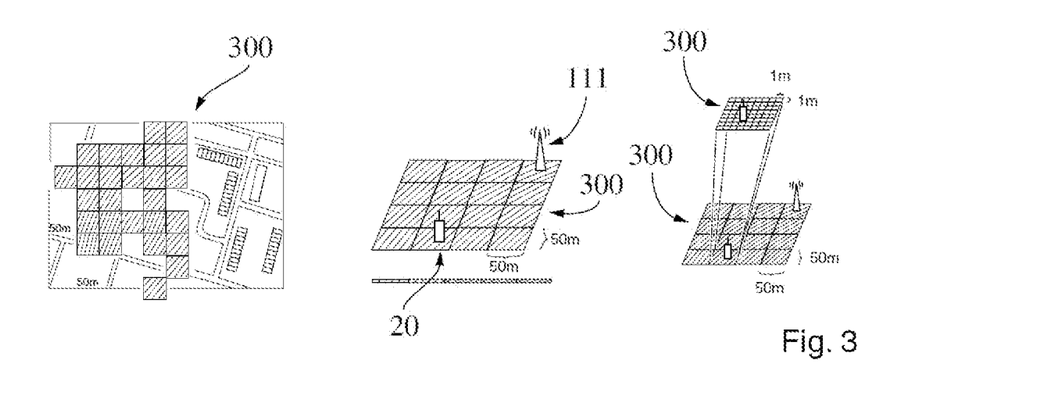
FIG. 3 schematically illustrates different possibilities of a geographical grid, the geographical grid having a plurality of grid portions or grid locations, wherein for each grid portion or grid location a value of the network performance and/or capability information (i.e. a performance and/or capability value) is determined.

In FIG. 3, different possibilities of a geographical grid 300 are schematically shown. The geographical grid 300 has or comprises a plurality of grid portions or grid locations, i.e. the geographical grid 300 comprises different grid portions such that each grid portion corresponds to a different geographical location or position within the chosen granularity of the geographical grid 300; this being especially visible on the left hand side portion of FIG. 3, where the geographical grid 300 is shown overlaid on a map section or portion.

Typically, for each grid portion or grid location (at least within a certain range in the vicinity of the geographical location 211, corresponding to a defined geographical section (around the geographical location 211) of, for example, but not specifically limited to 1 meter or 2 meters or 5 meters, 10 meters or 30 meters or 50 meters or 100 meters or 300 meters or 1000 meters), a value of the network performance and/or capability information 220 (i.e. a performance and/or capability value) is determined and preferably displayed on the display device 25 or the projection device of or assigned to the user equipment 20. The visualization of the network performance and/or capability information 220 is preferably done via different color settings and/or different contrast settings and/or different saturation settings, thus conveying the information of a rather better or a rather worse network coverage of the mobile communication network 100 at the respective geographical locations corresponding to the grid portion or grid location considered. In FIG. 3 (and FIG. 5) this is represented via different hatchings of the different grid portions or grid locations whose hatch lines are more or less inclined depending on the value of the network performance and/or capability information 220 to be displayed at or for the respective grid portion or grid location. In the middle part of FIG. 3, an example of a geographical grid is schematically shown (in perspective view), exemplarily having square shaped grid portions or grid locations of 50 meter side length (i.e. the grid portions or grid locations having an area of 2500 square meters); in that exemplary representation of a geographical grid 300, a base station entity 111 is shown in the upper right grid portion, and a user equipment 20 is shown in one of the lower grid portions; it is visible from the different hatchings that the corresponding values of the network performance and/or capability information 220 indicate a better radio coverage (or network coverage) in the vicinity of the base station entity 111 than further away from the base station entity 111. In the right hand part of FIG. 3, two different examples of geographical grids 300 are shown, one of these examples having square shaped grid portions or grid locations of 50 meter side length, and the other having square shaped grid portions or grid locations of 1 meter side length (i.e. the grid portions or grid locations having an area of 1 square meter). According to the present invention, other geographical grids 300 are possible to be used, e.g. geographical grids 300 having grid portions or grid locations being shaped differently from squares, being, e.g., shaped as rectangles or triangles (especially equilateral triangles or isosceles triangles) or shaped as hexagons (especially regular hexagons). Likewise, other geographical grids 300 are possible to be used according to the present invention, having grid portions or grid locations of different sizes, e.g. squares of 5 meter side length, or of 7 meter side length or of 10 meter side length or of 20 meter side length or of 30 meter side length. Dividing a geographical area into theoretical grid portions or grid locations or grid squares of a geographical grid 300, especially corresponds to the operation of basic 5S coverage systems. According to the present invention, it is advantageously possible that the network performance and/or capability information 220 comprises different parts corresponding to different radio access technologies, e.g. a first part related to a first radio access technology and a second part related to a second radio access technology. Hence, in order to support multiple augmented or virtual reality overlays (especially regarding different radio access technologies), each grid square (or grid portion or grid location) can support different metadata parameters (or different parts of the network performance and/or capability information 220), especially corresponding to a 'coverage' overlay based on mobile network signal strength in addition to other types of data such as wireless access point derived data (e.g. temperature, humidity, ambient noise, air quality, traffic data). The planning tool used within the mobile communication network 100 provides or calculates an initial coverage value for each grid portion or grid location based on predicted signal strength; this information corresponds to the network planning information 250. This information is used by the user equipment 20 to provide an initial view or an initial performance and/or capability value regarding coverage availability at the location of the corresponding grid portion or grid location. Signal strength in the near vicinity of the base station (or base station entity 111) is typically strongest (e.g. −75 dBm) with the radio signal weakening the further the user equipment 20 is away from the base station (or base station entity 111) (e.g. −98 dBm), cf. the representation in the middle of FIG. 3. To allow for improved granularity of coverage (representation in the augmented or virtual reality overlay), each grid portion or grid location of a geographical grid having bigger squares can be further sub-divided into smaller squares, such as, e.g., down to 1 meter granularity (cf. the right hand part of the FIG. 3). Micro level squares can receive their associated metadata from different sources. For coverage, the measured signal strength of the handset (MSSH) can be used according to one embodiment of the present invention; alternatively, interpolation of the predicted signal strength from the planning system (within the bigger squares) can be used. This latter approach is preferable as the measured signal strength of the handset (or user equipment 20) is typically more indicative of the actual coverage or coverage performance, hence, the values obtained from the network planning system and from the actual user equipment 20 measurements might differ, i.e. different values might be recorded at the micro level (i.e. the geographical grid having smaller grid portions) than at the macro level (i.e. the geographical grid having bigger grid portions).

In this context, the augmented reality overlay or virtual reality overlay (i.e. the values of the network performance and/or capability information 220) on the handset (or user equipment 20) is calculated either by using the underlying signal strength from the planning system associated with each grid square or by using the MSSH (i.e. the signal strength measured by the user equipment 20). In both cases, typically the GPS position (i.e. the geographical location) of the user equipment 20 is required to determine the location of the user equipment 20 and associate this with the planning system's reference grid system (or geographical grid 300). The signal strength value of the user equipment's location grid square and all other squares form the basis for the values of the network performance and/or capability information 220. In order to ensure consistency of look and feel for a user of the user equipment 20, each signal level is associated with a defined/system determined height in the augmented reality or virtual reality overlay which remains constant from cell to cell. This ensures, for example, that a signal peak of −75 dBm is always shown at 50% in the augmented reality or virtual reality overlay (even when taking into account different user equipment screen sizes and resolutions). As the planning system signal strength values will most likely vary from the MSSH (i.e. the signal strength values measured by the user equipment 20), the handset (or user equipment 20) needs to determine how to handle such differences between MSSH values versus planning system signal data or values. According to a preferred embodiment of the present invention, an interpolation provides for a handling of such differences, wherein the interpolated values (that are eventually displayed as the network performance and/or capability information 220 to the user of the user equipment 20) are obtained using interpolation for the grid portions or grid locations of a system defined geographical grid, having, e.g., grid portions corresponding to 10 square meter. The interpolated values of the network performance and/or capability information are preferably calculated for 360° across or around the interpolated area which is explained in greater detail below and in connection to FIG. 4; this especially being achieved by calculating the angle and distance between the location of the user equipment 20 and the corresponding base station entity 111 and by extrapolating the MSSH values to the base station entity 111.

Figure 4:
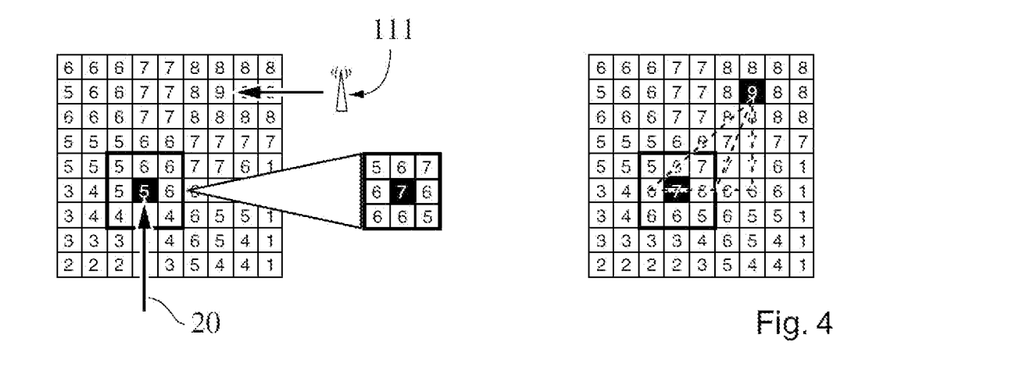
FIG. 4 schematically illustrates an example to calculate the performance and/or capability values for a situation of a user equipment being positioned relative to a base station entity.

In FIG. 4, an example to calculate the performance and/or capability values for a situation of a user equipment 20 being positioned relative to a base station entity 111 is schematically shown. On the left hand part of FIG. 4, a section of the geographical grid 300 is schematically shown as an example, wherein the indicated values of the different grid portions or grid locations correspond to the values or data provided by the planning system of the mobile communication network 100. The locations of the base station entity 111 and of the user equipment 20 are indicated via the corresponding reference signs and marked via an inverted representation. According to an advantageous example according to the present invention, the values of the network performance and/or capability information 220 (shown or displayed to the user of the user equipment 20) correspond to interpolated values of the raw values provided by the planning system and obtained via signal strength measurements performed by the user equipment 20. In case that the MSSH values of measurements of the user equipment 20 differ to those of the planning system, a new set of interpolated values is calculated for all neighboring grid portions or grid locations within a given area, preferably around the current position of the user equipment 20, which is indicated via a square around the position of the user equipment 20: The raw data provided by the planning system, e.g. yield indicative values of the network coverage (in clockwise direction starting at the upper grid portion (located "at 12 o'clock" with reference to the location of the user equipment 20)) of "6", "6", "5", "4", "4", "4", "5", "5", with the value at the location (or grid portion) of the user equipment 20 yielding "5" (marked in inverted representation). These values at the location of the user equipment 20 itself and in the vicinity of this location are modified to obtain the values of the network performance and/or capability information 220 to actually be displayed and shown to the user of the user equipment 20, which is shown via a square of interpolated MSSH values 360° around the position of the user equipment 20, the interpolated values yielding (again in clockwise direction starting at the upper grid portion) of "6", "7", "6", "5", "6", "6", "6", "5", with the value at the location (or grid portion) of the user equipment 20 yielding "7" (instead of "5"). The network performance and/or capability information 220 preferably uses the interpolated values within the exemplarily shown squares of grid portions around the location of the user equipment 20 (MSSH area) and preferably otherwise uses the planning system values outside this area. In case a further interpolation is required (an MSSH area requiring newly calculated values), this is preferably done by calculating the angle and distance of the relevant grid portions considered, which is shown on the right hand part of FIG. 4 for two different grid portions or grid locations (both shown in inverted representation in the grid portion or grid location to the left ("at 9 o'clock") from the location of the user equipment 20 and in the grid portion or grid location to the bottom right ("at half past 4 o'clock") from the location of the user equipment 20) to the user equipment 20 and to the base station entity 111 and interpolating a value from the MSSH value at the location of the user equipment 20.

The calculation of the different interpolated values, shown in FIG. 4, to be displayed as the network performance and/or capability information 220 to a user of the user equipment 20, is an example of the performance and/or capability value displayed for a specific grid portion or a specific grid location being calculated based on values of the network planning information 250 and values of at least one of the first measurement information 260 and the second measurement information 270 corresponding to the specific grid portion or the specific grid location itself, wherein:

the corresponding values of the network planning information 250 and values of at least one of the first measurement information 260 and the second measurement information 270 of at least part of the grid portions or the grid locations being direct neighbors of the specific grid portion or the specific grid location, and/or the corresponding values of the network planning information 250 and values of at least one of the first measurement information 260 and the second measurement information 270 of at least part of the grid portions or the grid locations being indirect neighbors of the specific grid portion or the specific grid location, and/or the distance of the specific grid portion or the specific grid location from one or a plurality of base station entities 111, 112 and/or of wireless access points 113, 114 and/or the orientation of the line segment between the specific grid portion or the specific grid location to one or a plurality of base station entities 111, 112 and/or of wireless access points 113, 114.

Figure 5:
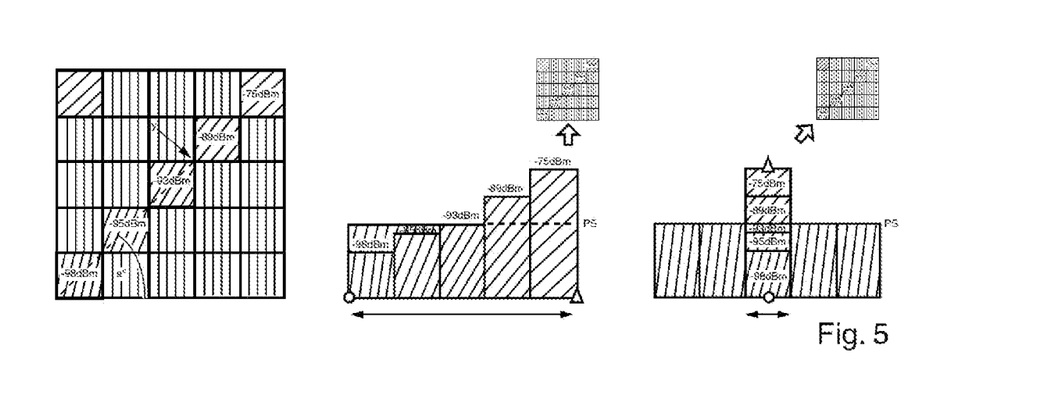
FIG. 5 schematically illustrates different examples of visualizing different performance and/or capability values for different locations of the user equipment or direction towards the base station entity.

In FIG. 5, different examples of visualizing different performance and/or capability values for different locations of the user equipment or direction towards the base station entity are schematically shown. In the left hand part of FIG. 5, an interpolation of the MSSH values between handset (or user equipment 20) and base station entity 111 is schematically shown, this interpolation preferably being based on the angle a, and the distance y to the base station entity 111. The respective signal strength MSSH (measured by the user equipment 20) and provided by the planning system PS creates a theoretical linear band of coverage. Advantageously according to the present invention, this band of coverage is used to populate all the portions of the geographical grid in a line between the user equipment 20 and the base station entity 111. Preferably, all other grid portions are calculated separately, based on their angle and distance to the base station entity 111, as explained in the context of FIG. 4. The size of the interpolation area, e.g. 10 meter and the size of grid square, e.g. 3.33 meter, will determine how many grid portions exist and need to be interpolated either linearly (as they are on the line or axis between the user equipment 20 and the base station entity 111) or individually. In the middle part of FIG. 5, a side view showing the MSSH value at the base station (−75 dBm—cf. the rightmost part of the middle part of FIG. 5) and interpolated values between the handset and base station. On the right hand part of FIG. 5, a heading view showing the MSSH value at the base station (−75 dBm) and interpolated values between the handset and the base station. Likewise, it is also possible (but not shown in FIG. 5) to provide a three-dimensional representation of the augmented reality or virtual reality overlay, e.g. in form of a multidimensional bar chart, having a bar for each grid portion or grid location to be displayed individually, i.e. based on the network performance and/or capability values associated with each grid portion or grid location, a three dimensional visualization of the coverage can be derived, preferably with a graphical smoothing to overcome the 'blocky' look and feel.

As a consequence, according to the present invention, a dynamic view of the network coverage is possible to be provided to the user of a user equipment 20, wherein planning system data are merged with MSSH data. As the user equipment 20 (or handset) moves (e.g. pans left/right) the MSSH changes and, hence, the corresponding network performance and/or capability information 220 is dynamically recalculated and the representation of the display device 25 or the projection device modified accordingly. Additionally, it is also possible to provide a more static representation involving only or primarily the planning system data, i.e. according to such an embodiment of the present invention, the planning system data are not merged with the MSSH data. Head-up shows planning system data only, with MSSH data shown as separate icon or indicator (e.g. elsewhere on the display). According to still an alternative embodiment, the MSSH data is omitted completely from the augmented reality or virtual reality display.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing network performance and/or capability information related to at least one mobile communication network and a user equipment, wherein the method comprises the following steps:

in a first step, obtaining location information corresponding to a geographical location, wherein the location information corresponds to a current geographical location of the user equipment and/or is provided by a user of the user equipment;

in a second step, subsequent to the first step, displaying network performance and/or capability information on a display device or a projection device corresponding to the user equipment, wherein the network performance and/or capability information comprises a plurality of performance and/or capability values for a geographical grid which includes the geographical location corresponding to the location information, wherein each respective performance and/or capability value of the plurality of performance and/or capability values is assigned to a respective grid portion or grid location of the geographical grid in the vicinity of the geographical location corresponding to the location information, wherein, for each one of the grid portions or grid locations, the corresponding performance and/or capability value is based on:

network planning information; and measurement information obtained prior to or during the second step related to one or more base station entities and/or one or more wireless access points of the at least one mobile communication network;

wherein the measurement information includes: first measurement information obtained by the user equipment based on the user equipment conducting measurements, and second measurement information relating to previous measurement events performed by a plurality of different user equipments within the at least one mobile communication network.

2. The method according to claim 1, wherein the network performance and/or capability information is displayed on the display device or the projection device as augmented reality information or virtual reality information.

3. The method according to claim 1, wherein the network planning information is transmitted, by the at least one mobile communication network, to the user equipment prior to or during the second step.

4. The method according to claim 1, wherein a first performance and/or capability value displayed for a first grid portion or grid location is calculated based on network planning information and measurement information for the first grid portion or grid location.

5. The method according to claim 1, wherein a first performance and/or capability value displayed for a first grid portion or grid location is calculated based on an interpolation of network planning information and measurement information obtained by the user equipment via conducting measurements of measured signal strength (MSSH) of the user equipment.

6. The method according to claim 1, wherein the location information comprises an indication of elevation of the geographical location corresponding to the location information, wherein the indication of elevation corresponds to an elevation above ground and/or to an elevation above sea level of the geographical location corresponding to the location information, and wherein a first performance and/or capability value displayed for a first grid portion or grid location is based on the indication of elevation of the location information.

7. The method according to claim 1, wherein the network performance and/or capability information comprises or is based on data transmission performance information, wherein the data transmission performance information is related to an expected data transmission performance at the geographical location corresponding to the location information.

8. The method according to claim 1, wherein the geographical grid comprises geographical height grid elements for one or more grid portions or grid locations, wherein different geographical height grid elements at a first grid portion or grid location correspond to different elevations or ranges of elevation above ground and/or to different elevations or ranges of elevation above sea level; and
wherein the location information comprises an indication of elevation of the geographical location corresponding to the location information, wherein the indication of elevation of the geographical location corresponds to identifying one geographical height grid element of the geographical grid.

9. The method according to claim 1, wherein the method further comprises:
in a third step subsequent to the first step, transmitting, from the user equipment to the at least one mobile communication network, report information, wherein the report information corresponds to measured and/or perceived network performance and/or to measured and/or perceived network capability of the at least one mobile communication network from the perspective of the user equipment.

10. The method according to claim 1, wherein the network performance and/or capability information comprises or is based on:
network fault information;
network maintenance information; and/or
network modification information, the network modification information relating to network sites to be deployed, upgraded, and/or removed.

11. The method according to claim 4, wherein the first performance and/or capability value is calculated further based on network planning information and measurement information for grid portions or grid locations which are direct neighbors of the first grid portion or grid location.

12. The method according to claim 4, wherein the first performance and/or capability value is calculated further based on network planning information and measurement information for grid portions or grid locations which are indirect neighbors of the first grid portion or grid location.

13. The method according to claim 4, wherein the first performance and/or capability value is calculated further based on:
a distance of the first grid portion or grid location from one or more base station entities and/or wireless access points; and/or
an orientation of a line segment between the first grid portion or grid location and one or more base station entities and/or wireless access points.

14. A system for provision of network performance and/or capability information related to at least one mobile communication network and a user equipment, the system comprising:
the user equipment, wherein the user equipment is configured to be connected to the at least one mobile communication network;
the at least one mobile communication network, wherein the at least one mobile communication network comprises an access network and a core network;
wherein the access network comprises a plurality of base station entities and/or a plurality of wireless access points;
wherein the user equipment comprises or is assigned to a display device or a projection device;
wherein the user equipment and/or the at least one mobile communication network is configured to obtain location information corresponding to a geographical location, wherein the location information corresponds to a current geographical location of the user equipment and/or is provided by a user of the user equipment;
wherein the display device or the projection device is configured to display network performance and/or capability information, wherein the network performance and/or capability information comprises a plurality of performance and/or capability values for a geographical grid which includes the geographical location corresponding to the location information, wherein each respective performance and/or capability value of the plurality of performance and/or capability values is assigned to a respective grid portion or grid location of the geographical grid in the vicinity of the geographical location corresponding to the location information, wherein, for each one of the grid portions or grid locations, the corresponding performance and/or capability value is based on:
network planning information; and
measurement information related to one or more of the base station entities and/or one or more of the wireless access points;
wherein the measurement information includes: first measurement information obtained by the user equipment based on the user equipment conducting measurements, and second measurement information relating to previous measurement events performed by a plurality of different user equipments within the at least one mobile communication network.

15. The system according to claim 14, wherein the mobile communication network further comprises a database entity, wherein the database entity comprises the network planning information and the measurement information.

16. A non-transitory computer-readable medium having processor-executable instructions stored thereon for providing network performance and/or capability information related to at least one mobile communication network and a user equipment, wherein the processor-executable instructions, when executed, facilitate performance of the following steps:
in a first step, obtaining location information corresponding to a geographical location, wherein the location information corresponds to a current geographical location of the user equipment and/or is provided by a user of the user equipment;
in a second step, subsequent to the first step, displaying network performance and/or capability information on a display device or a projection device corresponding to the user equipment, wherein the network performance and/or capability information comprises a plurality of performance and/or capability values for a geographical grid which includes the geographical location corresponding to the location information, wherein each respective performance and/or capability value of the plurality of performance and/or capability values is assigned to a respective grid portion or grid location of the geographical grid in the vicinity of the geographical location corresponding to the location information, wherein, for each one of the grid portions or grid locations, the corresponding performance and/or capability value is based on:
network planning information; and
measurement information obtained prior to or during the second step related to one or more base station entities and/or one or more wireless access points of the at least one mobile communication network;
wherein the measurement information includes: first measurement information obtained by the user equipment based on the user equipment conducting measurements, and second measurement information relating to previous measurement events performed by a plurality of different user equipments within the at least one mobile communication network.

17. The method according to claim 1, wherein during or after the first step, the location information is transmitted, by the user equipment to the at least one mobile communication network, and wherein network performance and/or capability information is requested, from the at least one mobile communication network, dependent on the location information.

18. The method according to claim 1, wherein the network performance and/or capability information comprises a first part and a second part, wherein the first part of the network performance and/or capability information is related to a first radio access technology and wherein the second part of the network performance and/or capability information is related to a second radio access technology.

\* \* \* \* \*